United States Patent [19]

King

[11] 4,213,159
[45] Jul. 15, 1980

[54] PNEUMATIC CLAMPS AND THERMOMAGNETIC DUPLICATION

[75] Inventor: James L. King, Southboro, Mass.

[73] Assignee: King Instrument Corporation, Westboro, Mass.

[21] Appl. No.: 955,373

[22] Filed: Oct. 27, 1978

[51] Int. Cl.$^2$ .......................... G11B 5/86; G11B 15/60
[52] U.S. Cl. ........................................ 360/16; 226/95
[58] Field of Search ...................... 360/16, 15, 71, 83, 360/90, 130.21, 130.3, 130.31, 130.32; 219/388, 469; 226/195, 7, 196

[56] References Cited

U.S. PATENT DOCUMENTS

| 3,632,898 | 1/1972 | Slade et al. | 360/16 |
| 3,824,617 | 7/1974 | Kobayashi et al. | 360/16 |
| 3,876,860 | 4/1975 | Nomura et al. | 360/16 |

OTHER PUBLICATIONS

IBM Tech. Disc. Bull., Marrs, Sink to Control Noise in an Externally Pressured Air Bearing, vol. 10, No. 11, Apr. 1968, pp. 1710-1711.

*Primary Examiner*—Alfred H. Eddleman
*Attorney, Agent, or Firm*—Schiller & Pandiscio

[57] ABSTRACT

A pneumatic clamp is disclosed for use in thermomagnetic duplication systems. The clamp comprises a nip member having a web-guiding surface with at least one passageway, means for connecting that passageway to a source of pressurized gas, and means for urging the nip member toward a roller whereby the pressurized gas exiting the passageway(s) will (a) cause a web or webs disposed between that surface and a roller to be pressed against the roller, (b) exert a back pressure urging the web-guiding surface away from the roller, and (c) form an air bearing between the nip member and the web or webs.

36 Claims, 10 Drawing Figures

PNEUMATIC CLAMPS AND THERMOMAGNETIC DUPLICATION

This invention relates to apparatus for clamping a moving web to a movable member and more particularly to the art of thermomagnetically duplicating signals recorded on a magnetic information storage carrier in the form of a web or tape.

Various systems have been proposed for carrying out a contact process for manufacturing copies of recordings from a master tape or web by thermoremanent transfer. Such a process, also known as "thermomagnetic contact copying", essentially involves having the magnetic elements of the copy member and the original or master member in contact with one another while the magnetic element of the copy member is at a temperature above its Curie temperature, then cooling the copy member to below its Curie temperature while it is still in contact with the master, and thereafter separating the two magnetic members. The separated copy member will have a mirror image replica of the recording on the master or original. Thermoremanent copying of magnetic signals has the advantage that the copied magnetic recording may have an intensity of magnetization equal to or even greater than that of the original.

However, the thermomagnetic copying technique has two disadvantages. One of them is that for high quality duplication the two tapes must be brought into firm contact with one another without any relative movement between them while the copy member is above its Curie temperature. The second is the critical need to control the relative tensions on the master and copy tapes or or webs to avoid distortion of the duplicated signal. Satisfying this requirement is complicated by the fact that the copy member tends to expand on heating and contract on cooling. It has been recognized that during the transport and handling of the master and copy tapes through the copy tape heating stage and the contacting (i.e. duplicating) stage, tension errors tend to occur in the copy tape as a result of the heating and cooling, and such errors tend to produce distortion of the signal recorded on the copy member relative to the signal on the master member.

Heretofore it has been recognized that a pneumatic device may be used to pressure clamp the master and copy tapes in intimate contact with one another to effect thermoremanent duplication. Such devices are employed in the thermal duplication apparatus disclosed by U.S. Pat. Nos. 3,777,075 and 3,825,948 to pressure clamp together a master tape and a slave (copy) tape for a predetermined distance along the length of the region where their paths coincide. An advantage of such pneumatic devices is that only the master tape need be driven by a capstan, with the copy tape being pulled along with the master tape as a result of the action of the air clamp. The air clamps disclosed in U.S. Pat. No. 3,825,948 also employ resilient members which can yield to accommodate variations in tape thickness and also changes in tape spacing due to debris trapped between them, whereby to avoid tape breakage or damage during high speed operation (as is well known, damage to the master is especially detrimental since it might involve permanent loss of a portion of the recorded information).

However, air clamps such as disclosed by the aforesaid patents have several disadvantages. For one thing, since the air forms an air bearing between each side of the clamp and the adjacent one of the two moving tapes, and since cooling of the copy tape below its Curie point is intended to occur before it moves out of intimate contact with the master tape, cooling of the copy tape below its Curie point must be effected through the adjacent mechanical part of the air clamp. However, heat conduction across an air bearing is relatively slow in comparison to the rate of heat transfer where the heat sink is in actual contact with member to be cooled. Accordingly, and in view of the high speeds at which a thermal duplicator must operate to take advantage of the speed and convenience of thermoremanent transfer, it is necessary that the air clamps disclosed in U.S. Pat. Nos. 3,777,075 and 3,825,948 maintain intimate tape contact over a relatively long path length in order to assure that the copy tape is below its Curie point before it moves out of contact with the master tape. Hence, such air clamps are less capable of cooling the copy tape to below its Curie temperature immediately upon contact with the master tape, as may be done, for example, when the two tapes are pressed together by two rollers as in the system disclosed by U.S. Pat. No. 3,699,267. Shortening the cooling time and hence the time required for the two tapes to be in contact with one another is desirable since it facilitates reducing and compensating for tension variations due to heating and cooling of the copy tape. In this connection is to be appreciated that the heating of the copy tape should be completed as close as possible to the duplicating stage so as to avoid having to heat the copy tape to a temperature substantially higher than its Curie point as a compensation for heat losses incurred before the tape enters the duplicating stage. U.S. Pat. No. 3,825,948 also acknowledges that threading the two tapes between the air clamps is time consuming and hence it provides a form of air clamp where the clamp halves can be moved toward and away from one another by a pneumatic actuator. However, such mechanism increases the cost and complexity of the air clamp since it must be capable of establishing a gap between the two clamp halves of only a few thousandths of an inch.

Heretofore pressure clamping master and copy tapes together also has been achieved by means of two rollers or drums, one of which is hard and has a good conductivity so as to function as a cooling member, and the other of which is made or has a peripheral surface made of a resilient material such as rubber so as to function as a pressure member. Such arrangements are shown in U.S. Pat. Nos. 3,971,009 and 3,699,267. In the development of this invention it has been determined that using a resilient pressure roller or drum is combination with a hard roller or drum to clamp a heated copy tape to a master tape to effect thermoremanent duplication is disadvantageous in that it tends to prevent accurate duplication. The difficulty arises from the fact that a rubber idler roller pressing a tape against a hard roll has a tendency to change its diameter and shape at the point of contact as it rotates, much as a tire on an automobile changes shape as it rolls along the ground. This deflection or distortion of the rubber roller may tend to cause burnishing of the tape as well as putting the tape under tension due to friction. Although this dynamic change in roller geometry may be small, its effect can be quite severe in a thermal duplication system where both the master and copy tapes tend to stretch under tension. The problem is more severe in the case of the copy tape which has a greater tendency to stretch due to being heated. Inaccurate reproduction will tend to result from such relatively greater stretching of the copy tape. This stretching of the tape is difficult to control since it is affected by the resiliency of the rubber roller and the clamping pressure. Even using a pneumatically positionable rubber nip roll of the type disclosed in U.S. Published Patent Application No. B333,876 will not eliminate the problem caused by nip roll deflection since it is difficult to get the correct amount of clamping pressure required for high-quality duplication pruposes without getting some deflection of the rubber roller at its point of contact.

The primary object of this invention is to provide an improved form of air clamp for holding a moving web or tape against a movable member. Another object is to provide an improved form of air clamp that is capable of clamping a moving web or tape against a rotating roll.

Still another object is to provide an air clamp for clamping two fast-moving webs or tapes against one another so that they can travel together with no relative movement between them.

A further object is to provide an air clamp system for a moving tape or web which is designed to effect rapid cooling of the tape or web by direct contact with a heat sink.

Still another object is to provide a thermomagnetic duplicating system with an air clamp which overcomes at least some of the disadvantages of the types of air clamps shown in U.S. Pat. Nos. 3,777,075 and 3,825,948.

Another significant object is to provide a new and improved method and apparatus for pneumatically clamping two webs or tapes together and for thermomagnetically duplicating on one magnetic member the information recorded on another magnetic member.

These and other objects and advantages hereinafter stated or made obvious are achieved by providing apparatus comprising a nip or clamping member having a web-guiding surface with at least one passageway therein and means for connecting that passageway to a source of pressurized gas, means supporting the nip member for movement toward and away from a roller, and means for urging the nip member toward the roller, whereby the pressurized gas exiting the passageway in the web-guiding surface will (1) cause a web or webs disposed between that surface and the roller to be pressed against the roller, (2) exert a back pressure urging said web-guiding surface away from said roller, and (3) form an air bearing between the nip member and the web or webs. Such an apparatus is capable of clamping two webs together so that there is substantially a line contact between them, thereby making the apparatus especially suitable for use in a system and method for thermally duplicating records on magnetic tapes or other magnetic recording media in web or sheet form.

Other features and advantages of the invention are set forth or made obvious by the following detailed specification and the associated drawings wherein:

Figure 1:
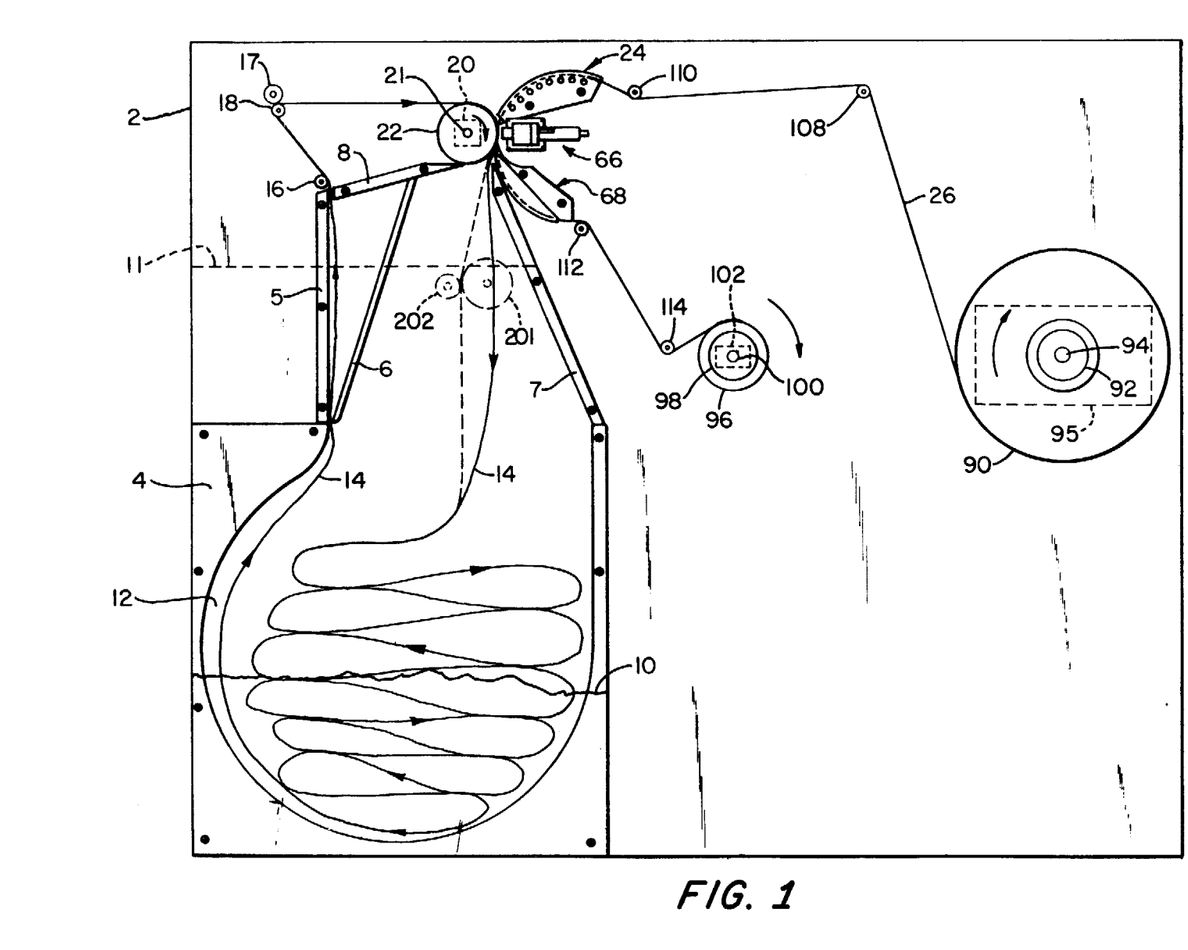
FIG. 1 is a diagramatic view of a system for high speed duplication of magnetic tape recordings in accordance with the present invention.
Figure 2:
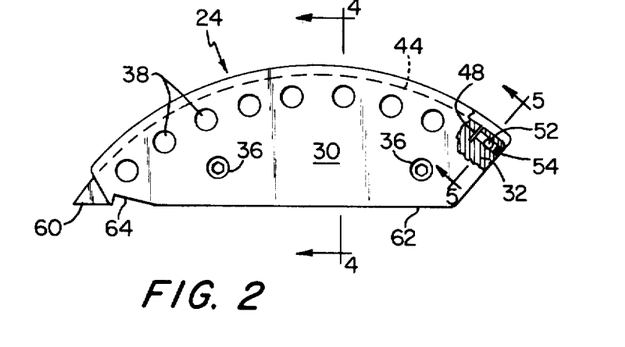
FIGS. 2 and 3 are enlarged front views of heating and cooling shoes respectively forming part of the apparatus of FIG. 1.

Referring now to FIG. 1, the illustrated apparatus comprises a front panel 2 to which spacer members 4, 5, 6, 7 and 8 and a transparent cover sheet or wall 10 are secured so as to form a bin 12 for containing an endless master tape 14 on which magnetic signals have been recorded. By way of example, master tape 14 may be a magnetic record of a selected video program. The upper part of sheet 10 is broken away from convenience of illustration. In practice sheet 10 preferably extends up close to the member 8, as represented by the dotted line 11. Additionally members 5 and 6 are disposed so that their lower ends form an exit orifice through which master tape 14 is removed from the bin. Rotatably mounted to a stub shaft affixed to panel 2 are guide rolls 16, 17 and 18. Preferably one or both of rolls 17 and 18 are spring mounted so as to be urged toward one another and thereby grip tape 14. Affixed to the rear side of panel 2 is a capstan drive 20 which preferably is an electric motor but may be a pneumatically or hydraulically powered turbine of the type shown in my prior U.S. Pat. No. 3,753,834. Drive 20 has a rotary output shaft 21 on which is mounted a capstan 22. Drive 20 is adapted to drive capstan 22 clockwise as viewed in FIG. 1. The members 7 and 8 form an entrance orifice through which master tape 14 is returned to bin 12. The right hand end of member 8 extends close to capstan 22 so as to make certain the master tape is returned to the bin and does not wind itself on the capstan.

Figure 4:
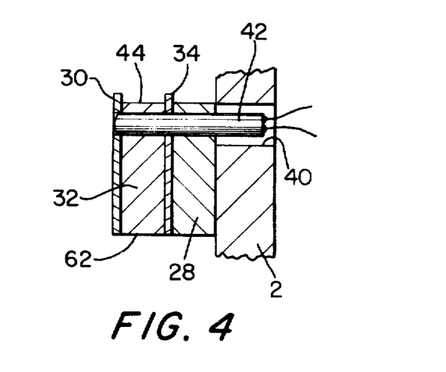
FIGS. 4, 5 and 6 are sectional views taken along lines 4—4 and 5—5 of FIG. 2 and line 6—6 of FIG. 3 respectively.
Figure 5:
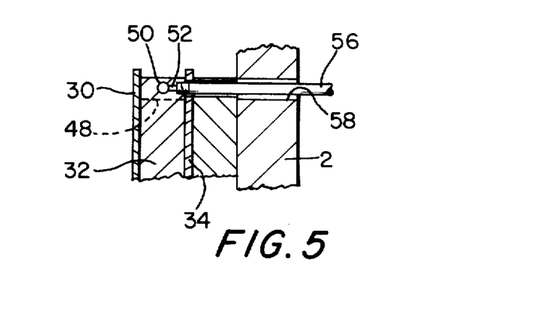
Figure 6:
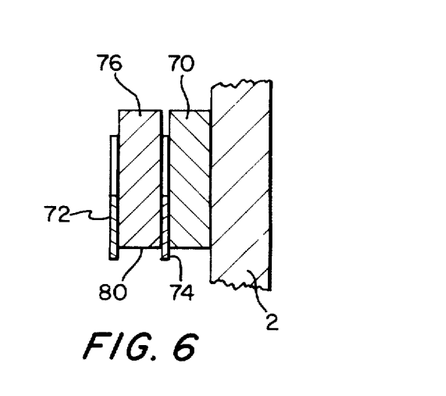

Attached to panel 2 above and to the right of capstan 22 is a heating shoe 23 for heating a slave or copy tape 26. As seen in FIGS. 4–6, shoe 24 comprises an insulating spacer block 28, front and rear side plates 30 and 34, and a heating block 32, all secured to one another and to panel 2 by means of socket bolts 36. Plates 30 and 34 and blocks 28 and 32 are provided with a series of matching holes, and disposed in each matching set of holes through an opening 40 in panel 2 is an electrical resistance heater 42. Heating block 32 has a thickness only slightly greater than the width of copy tape 26 and its upper surface 44 is curved as shown. Side plates 30 and 34 project above upper surface 44, whereby the two side plates and surface 44 form a guide track for tape 26. Heater block 32 is formed with a slot 48 intersecting its surface 44, and a bore 50 which intersects both slot 48 and a tapped hole 52 formed in the rear side of block 32. The outer end of bore 50 is closed off by a suitable plug 54, and a pipe 56 is secured into hole 52 through an opening 58 in panel 2. The opposite ends of slot 48 are closed off by plates 30 and 34. Although not shown, it is to be understood that pipe 56 is connected by suitable means such as a flexible hose to a suitable source of vacuum, e.g. a vacuum pump, whereby a suction force is provided to hold tape 26 down against the hot surface 44 of the heating shoe while the tape is being transported through the duplicating stage hereinafter described. Shoe 24 is disposed so that the curved surface 44 of heating block 32 approaches the capstan at a tangent or near tangent angle but terminates a suitable distance short of the point of tangency. Preferably heating block 32 terminates in a pointed end 60, with its bottom surface 62 and the corresponding surfaces of plates 30, 32 and 28 disposed at an angle and knotched as at 64 to accommodate air clamp assembly 66 provided in accordance with this invention.

Figure 3:
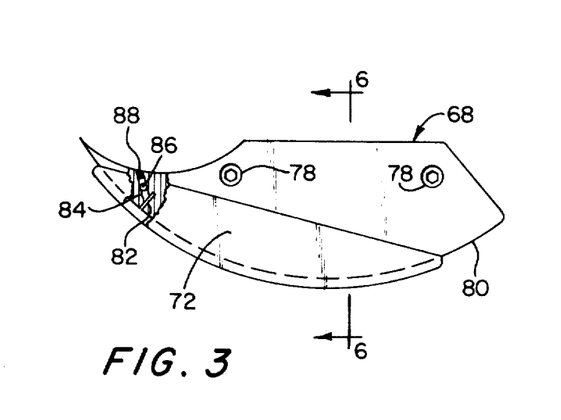

Also attached to front panel 2 is a cooling shoe 68, which is similar in construction to heating shoe 24 in that it comprises a spacer block 70, a pair of side plates 72 and 74, and a metal cooling block 76, all secured to each other and to panel 2 by means of socket bolts 78. Cooling block 76 has a thickness only slightly greater than the width of copy tape 26 and has a curved surface 80 which coacts with the lower margins of side plates 72 and 74 to form a guide track for tape. A slot 82 in surface 80 is intersected by a bore 84 which in turn is intersected by a tapped hole 86 and closed off by a plug 88. A pipe (not shown) similar to pipe 56 is screwed into tapped hole 86 through an opening in panel 2. Pipe 56 serves to connect slot 82 to a suitable vacuum source, e.g., a vacuum pump which is also connected to pipe 56, whereby a suction force is provided to hold tape 26 against surface 80 while the tape is being transported away from capstan 22.

Copy tape 26 is supplied from a supply reel 90 mounted on a hub 92 attached to a shaft 94 which extends through and is rotatably mounted to front panel 2 by suitable means (not shown) which may but need not comprise servo-controlled drive means (diagrammatically represented in phantom at 95) for driving shaft 94 at a speed which will maintain a selected tension on tape 26. As an alternate measure, shaft 94 may be free-wheeling and the servo-controlled drive means 95 may be replaced by a suitable drag means such as an eddy current brake (not shown) for exerting drag on shaft 94 to the extent required to keep tape 26 under suitable tension. After duplication, tape 26 is rewound on a take-up reel 96 mounted on a take-up hub 98. The latter is affixed to a shaft 100 which is coupled to a take-up drive 102 mounted to the rear side of panel 2. Take-up drive 102 may be an electric motor or a pneumatic or hydraulic turbine and is adapted to drive shaft 100 clockwise as seen in FIG. 1.

Movement of tape 26 between supply reel 90 and take-up reel 96 is guided by means of a plurality of guide rolls 108, 110, 112 and 114 which are rotatably mounted on stub shafts attached to front panel 2. If desired, one or more of these guide rolls such as rolls 108 and 114 may be movably mounted, e.g. mounted by a spring-loaded pivotal lever as shown in U.S. Pat. No. 3,699,267, so as to take up any slack in tape 26 and provide additional tape tension.

Figure 7:
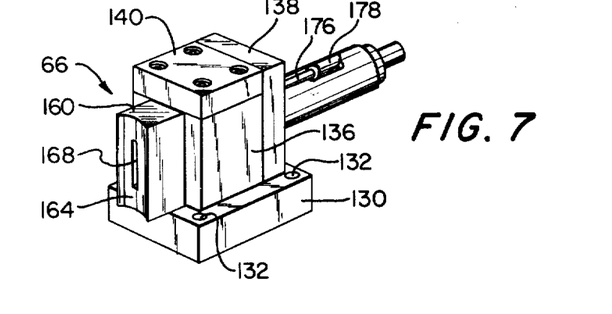
FIG. 7 is a perspective view of the pneumatic clamp assembly forming part of the apparatus of FIG. 1.
Figure 8:
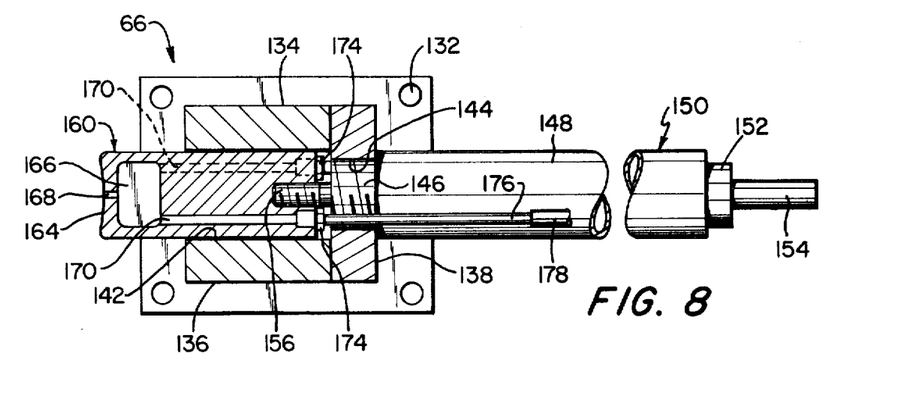
FIG. 8 is a sectional view of the same clamp assembly taken along line 8—8 of FIG. 9.
Figure 9:
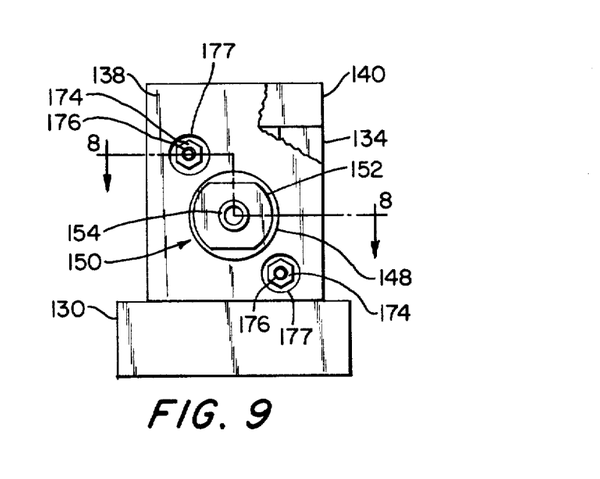
FIG. 9 is an end view of the same clamp assembly looking from right to left in FIG. 1.

Turning now to FIGS. 7-9, the air clamp assembly 66 comprises a mounting plate 130 provided with apertures 132 to accommodate bolts for attaching it to the front panel 2. Secured to the mounting plate 130 are four additional plates 134, 136, 138 and 140, with the plates 134 and 136 being mutually spaced side-by-side and sandwiched between plate 140 and mounting plate 130. Plate 138 is disposed at a right angle to each of the other plates 130, 134, 136 and 140, with a result that a rectangular channel 142 closed at one end is formed by the foregoing plates.

Plate 138 is provided with a large center hole 144 which is threaded to receive a threaded collar 146 which is attached to and forms a supporting extension of the cylinder 148 of a pneumatic actuator 150. The actuator is of the single acting type, with air being introduced to the cylinder 148 by way of an end fitting 152 provided with a nipple 154 for receiving a hose whereby it is coupled to a suitable source of high pressure air, e.g. an air compressor. Although not shown, it is to be understood that actuator 150 includes a piston suitably disposed within cylinder 148 and a spring which urges the piston in a direction away from the collar 146 toward the fitting 152. Actuator 150 also is provided with a piston rod 156 which is attached to its piston (not shown) and extends slidably through collar 146. The outer end of piston rod 156 is threaded and is screwed into a threaded opening in a block 160 which is disposed in channel 142 and forms a pneumatic nip member. Block 160 is rectangular in cross-section and is sized so as to make a close sliding fit in channel 142. As seen in FIG. 8, the rear end of block 160 is flat, while its opposite or front end is provided with a surface 164 which has a concave structure in one direction and is straight in the opposite direction. Air clamp 66 is disposed so that its curved surface 164 is concentric with capstan shaft 21 and operation of actuator 150 will cause surface 164 to be displaced radially of the capstan.

Still referring to FIGS. 7 and 8, block 160 is formed with an internal cavity 166 which serves as a manifold for supplying air to a slot 168 which is formed in the forward end wall of block 160 and intersects concave surface 164. As seen in FIG. 7, slot 168 is elongated, having a relatively long dimension transversely to the direction of curvature of surface 164 and a relatively small dimension in the direction of such curvature. Air is supplied to the manifold chamber 166 via a pair of passageways 170 which intersect the rear surface of block 160. Mounted in the rear ends of the passageways 170 are two fittings 174 which serve to affix a pair of elongate stiff or rigid tubes 176 to block 160. Tubes 176 slidably extend through oversized holes 177 formed in plate 138, and attached to the outer ends of tubes 176 are flexible hoses 178 which serve to connect the tubes to a suitably supply of high pressure air, e.g. an air compressor. The concave end surface 164 has a radius of curvature the same as that of capstan 22.

In addition to acting as a tape support, capstan 22 serves to cool the master tape so as to maintain it below its Curie point temperature and also to rapidly cool the copy tape from above to below its Curie point temperature. Accordingly the capstan is made of a metal so as to be capable of functioning as a heat sink. The capstan is made of a metal material which has a relatively high heat conductivity so as to assure rapid removal of heat from the master and copy tapes while they are in contact with the capstan. The metal material also must have sufficient strength and hardness for the capstan to present a substantially rigid tape-supporting surface. It has been found that the best results are obtained with a capstan made of brass and plated with a relatively thin (e.g. 0.002–0.010 inch) coating of silver or a silver alloy. The diameter of the capstan and the angular extension of surface 164 may be varied. However, the capstan should have a mass sufficiently great for it to rapidly remove heat from the master and copy tape and remain at a substantially constant temperature during normal operation of the machine. Preferably but not necessarily the capstan has a diameter of between about two and about six inches. Preferably surface 164 extends through an angle of about 15–30 degrees.

Figure 10:
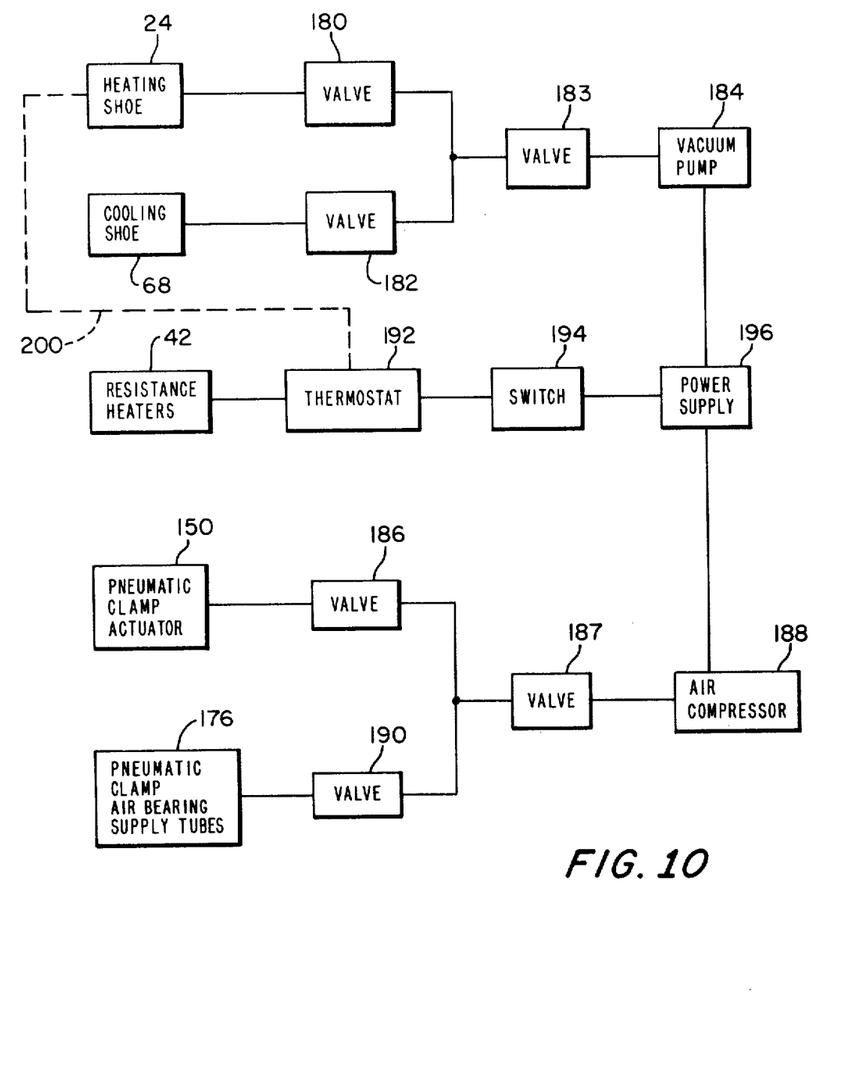
FIG. 10 is a diagrammatic view illustrating the electrical and pneumatic control system for the pneumatic clamp assembly.

FIG. 10 illustrates how vacuum and high pressure air are coupled to shoes 24 and 68 and pneumatic clamp 66. Shoes 24 and 68 are connected via suitable flow control valves 180 and 182 and a shutoff valve 183 to a suitable vacuum supply, e.g., a vacuum pump 184. The cylinder of actuator 150 is connected via a flow control valve 186 and a shutoff valve 187 to a suitable high pressure air supply, e.g., an air compressor 188. The air tubes 176 of clamp 66 are connected to the same high pressure air supply via another flow control valve 190 and valve 187. Electrical current for heating the resistance heaters in shoe 24 is provided by a suitable electrical power supply 196 via a thermostat 192 and an on/off control switch 194. The broken line 200 in FIG. 10 is intended to indicate in a diagrammatic way that the thermostat 192 (or at least the heat-sensing portion thereof) is mounted within or against the heating shoe 24 so as to sense the temperature of the heating shoe. Thermostat 192 is set so as to maintain the operating temperature of shoe 24 substantially constant at a value such that the rate of heating of the copy tape as it passes over the heating shoe during normal operations of the video reproduction system is sufficient for the copy tape to be slightly above its Curie temperature (preferably between about 10°-20° C. above the Curie point) as it passes from the heating shoe into contact with the master tape on capstan 22.

Following is a description of the operation of the foregoing video duplication system. While valve 187 is closed so as to keep air clamp actuator 150 in retracted position, valve 183 is opened so as to apply a suction force to heating shoe 24 and cooling shoe 68. Then the leading end of copy tape 26 is pulled off of supply reel 90, then threaded as shown over or under the several guide rolls so as to extend over shoe 24, between capstan 22 and air clamp 66, and under shoe 68, and finally attached to take-up reel 96. The master tape, threaded as shown between rollers 17 and 18, extends between capstan 22 and copy tape 26. Then switch 194 is closed so as to energize heaters 42 and valve 187 is opened so as to supply high pressure air to actuator 150 and supply tubes 176. After valve 187 is opened and before or shortly after heaters 42 are energized, drive means 20, 95 and 102 are actuated by suitable means (not shown) to cause the copy tape to be transferred from supply reel 90 to take-up reel 96. The high pressur air supplied to actuator 150 will urge nip member 160 toward capstan 22; simultaneously the air which is supplied to tubes 176 and exits the nip member via slot 168 will create a high pressure air layer between the nip member's curved surface 164 and the copy tape. This air layer (which is constantly being depleted by discharge bidirectionally lengthwise of the copy tape and replenished via slot 168) serves to press the copy tape against the master tape and thereby press the master tape against the capstan, so that both tapes are transported by the capstan with no relative movement between the two tapes during the time that they are in contact with one another. The same air layer also serves to exert a pneumatic force on curved surface before 164 in opposition to the force exerted by clamp actuator 150, whereby the nip member is biased away from the copy tape and thus prevented from directly engaging the copy tape. As a consequence the same air layer is maintained with sufficient thickness or depth to serve as an air bearing between the copy tape and the curved surface 164, thereby allowing the copy tape to travel at a high speed past the nip member. The back pressure exerted by the air layer and the thickness of the air layer are adjusted by varying the air pressure applied to actuator 150 (controlled by valve 186) and the amount of air supplied to supply tubes 176 (actuated by valve 190). Until heating shoe 24 gets up to its predetermined steady state operating temperature above the Curie point of copy tape 26, no thermal reproduction, or at least no high quality thermal reproduction, will occur. However, as soon as the heating shoe gets up to its predetermined operating temperature, high quality (i.e. high signal-to-noise ratio) reproduction may be carried out at relatively high speeds. As noted previously the steady state operating temperature of heating shoe 24 is set by adjustment of thermostat 92. Typically, the master and copy tapes are transported at approximately eight feet per second. At such a tape transport speed, if heating shoe 24 is heated to about 30°-60° C. above the Curie Point of copy tape 26, the latter will be about 10°-20° C. above its Curie Point as it leaves the heating shoe and contacts the master tape, and the copy and master tapes will be held together on capstan 22 just long enough for thermal duplication to occur. The capstan 22 acts as an excellent heat sink to prevent the temperature of the master tape from rising more than a few degrees above its normal room temperature while engaged by the copy tape. The copy tape is cooled rapidly to below its Curie point during the short time it is in engagement with the master tape on capstan 22. Some cooling of the copy tape tends to result from exchange of heat with the air layer between it and the nip member. However, the extent of such cooling is limited due to the relatively low heat transfer coefficient of the air layer. Thus, substantially all of the cooling of the copy tape from above to below its Curie point temperature is accomplished by capstan 22. As the copy tape passes along surface 80 of cooling shoe 68 it is rapidly cooled from below its Curie point temperature to a temperature close to room temperature. Since the tendency of a plastic magnetic tape to stretch under tension decreases as its temperature decreases from its Curie point toward room temperature, the quick cooling effected by shoe 68 serves to limit the amount of time the copy tape is at an elevated temperature, whereby at any one time only a short section of the copy tape is hot enough to tend to stretch easily under relatively little tension. This reduces errors due to tape stretch.

Since no physical distortion of either the master or copy tape is produced by the pneumatic clamping action of nip member 160, the attainment of duplication of signals without error due to physical distortion of the master or copy tape is possible if the two tape transporting systems are arranged so as not to distort either tape (i.e. by stretching it) or else produce mutually off-setting distortions. In the illustrated apparatus the transport system for the master tape may have a variable speed drive 20 for the capstan which may be operated so that a non-varying tension is applied to the master tape between it and guide rolls 17 and 18, while the drives 95 and 102 for the copy tape may be operated so that the tension on the copy tape between the capstan and guide roll 110, and also between guide roll 112 and take-up reel 96, may be maintained precisely at a value (determined in accordance with the thermal coefficient of expansion of the copy tape) calculated to reproduce on the copy tape a video record having the same line count per frame as the master tape.

The invention has a number of advantages, one of which is that it is capable of a number of modifications. For example, other tape transport systems may be preferred or used in the practice of this invention. Thus for video record reproductions, it may be preferred to omit capstan drive 20 and thereby make the capstan freewheeling, and to effect movement of the master tape under controlled tension by providing a master tape drive comprising two pull rolls 201 and 202 located downstream of the capstan. One or both of rolls 201 and 202 may be positively driven, e.g., by a servo-controlled drive system operating in synchronism with copy tape take-up reel drive 102. However, even in such event capstan 22 will be made of a good heat conductor so as to serve as a heat sink for the master tape and copy tapes as described above. The heat sink function of capstan 22 is also advantageous in that it permits sufficient control over the master tape temperature as to prevent or suitably limit stretching of the master tape under the tension to which it is subjected.

Another possible modification is to replace slot 168 with a number of small holes arranged in a straight line or disposed in a two-dimensional (e.g., rectangular) array, along the length and breadth of surface 164. If desired, the cooling capacity of cooling shoe 68 may be increased by circulating a cooling fluid through it. However, the mass of shoe 68 may be made great enough conveniently for it to remove heat fast enough from the copy tape without having to cool it by means of a circulating cooling fluid. It also is obvious that the cooling effect of capstan 22 may be increased by providing means on the rear side of panel 2 for rapidly cooling shaft 21, e.g. a water-cooled shoe surrounding and lightly engaging shaft 21. However, in the usual case adequate cooling of capstan 22 is achieved by radiative loss of heat to the atmosphere directly by the capstan and indirectly by shaft 21 and also loss of heat by conduction to the components supporting and connected to shaft 21.

Another advantage of the invention is that the air clamp member may be used in other thermal reproduction systems and even in other tape or web transport systems involving a single tape or web, e.g., in systems for making, recording, slitting, recording or packaging magnetic tape, photographic film or other easily damaged tape or web materials. Other important advantages are the simplicity, reliability and ease of operation and adjustment of the air clamp, the heat dissipation capability of the capstan by itself and in combination with the air clamp (particularly since the size of the capstan is variable), the endless belt configuration of the master tape so that a plurality of copies may be made without having to stop the system for rewinding of the master tape, and the high tape transport speeds which may be used while producing high quality reproductions. The invention also may be used to thermally reproduce audio as well as or instead of video recordings. Still other advantages and possible modifications of the invention will be obvious to persons skilled in the art.

As used in the following claims, the term "web" is to be construed as including a tape unless a contrary meaning is clearly indicated.

What is claimed is:

1. Apparatus for maintaining at least one moving web in tight engagement with a roller comprising:
   a nip member having a web-guiding surface with at least one passageway therein and means for connecting said at least one passageway to a source of pressurized gas;
   support means for supporting said nip member for reciprocal movement relative to said support means whereby movement of said nip member relative to said support means results in a change of position of said web-guiding surface along a selected path;
   said support means being adapted to support said nip member in proximity to a selected roller so that movement of said nip member in a first direction relative to said support means will result in movement of said surface along said selected path toward said selected roller; and
   fluid-operated means for urging said nip member to move in said first direction relative to said support means so as to advance said surface toward engagement with a selected roller located in proximity to said nip member;
   said surface and said at least one passageway being arranged so that pressurized gas exiting from said at least one passageway will be directed against a selected roller confronting said surface, whereby if a web is disposed between said surface and said selected roller, the gas exiting said at least one passageway will press said web into engagement with said selected roller and will exert a back pressure on said surface urging said surface away from said roller and web.

2. Apparatus according to claim 1 wherein said web-guiding surface is curved.

3. Apparatus according to claim 1 wherein said nip member has a hollow section defining a chamber which communicates with said at least one passageway and said means for connecting said at least one passageway to a source of pressurized gas.

4. Apparatus according to claim 3 wherein said nip member has an end wall terminating said hollow section and said web-guiding surface is a part of said end wall.

5. Apparatus according to claim 4 wherein said at least one passageway extends through said end wall.

6. Apparatus according to claim 1 wherein said fluid-operated means for urging said nip member to move in said first direction comprises a fluid pressure-exerting means.

7. Apparatus according to claim 6 wherein said fluid pressure-exerting means comprises a fluid actuator.

8. Apparatus according to claim 7 wherein said fluid actuator is supported by said support means.

9. Apparatus according to claim 8 wherein said support means comprises guide means slidably engaging said nip member and said actuator has a drive member connected to said nip member.

10. Apparatus according to claim 9 wherein said drive member is perpendicular to at least a portion of said web-guiding surface.

11. Apparatus according to claim 9 wherein said web-guiding surface has a circular curvature and said drive member extends along an axis that is substantially at a right angle to the axis of curvature of said web-guiding surface.

12. Apparatus according to claim 11 further including a roller located in proximity to said nip member, said roller having an axis of rotation which extends substantially parallel to said axis of curvature and a radius which is substantially equal to the radius of curvature of said web-guiding surface.

13. Apparatus according to claim 12 wherein said roller is made of a metal material.

14. Apparatus for use in transporting and guiding at least one web comprising:
   a roller having a peripheral surface;
   a nip member for use in pressing said at least one web against said peripheral surface as said web is transported past said nip member, said nip member having a web-guiding surface with at least one gas-discharge passageway therein for directing a gas toward said roller;

support means for supporting said nip member so that said nip member is capable of movement along a selected path whereby to advance said web-guiding surface toward and away from said peripheral surface;

means for connecting said at least one passageway to a source of pressurized gas whereby said gas will exit from said at least one passageway and be directed toward said roller; and fluid pressure-exerting means for urging said nip member to move so as to advance said web-guiding surface toward engagement with said roller, whereby when a web is disposed between said peripheral surface and said web-guiding surface, gas under pressure exiting said at least one passageway will press said web into engagement with said roller while allowing the web to move and will exert a back pressure on said web-guiding surface tending to urge said nip member away from said roller and establish a gas bearing between said nip member and said web.

15. Apparatus according to claim 14 wherein at least part of said web-guiding surface is curved.

16. Apparatus according to claim 15 wherein said curved web-guiding surface has substantially the same radius of curvature as said peripheral surface.

17. Apparatus according to claim 14 wherein said nip member is movable along a straight line extending substantially radially from the axis of rotation of said roll.

18. Apparatus according to claim 14 wherein said fluid pressure-exerting means comprises a fluid actuator mounted to said support means and having a drive member connected to said nip member, and further wherein said support means further includes means for supplying a fluid under pressure to said actuator so as to cause said drive member to urge said nip member to advance said web-guiding surface toward engagement with said roller.

19. Apparatus according to claim 18 wherein said nip member has a hollow section which is closed off at one end by an end wall, and said web-guiding surface is a part of said end wall.

20. Apparatus according to claim 18 further including means for varying the rate of gas flow exiting said at least one passageway.

21. Apparatus according to claim 18 further including means for varying the pressure of the fluid applied to said actuator so as to vary the force exerted by said drive member in urging said nip member toward said roller.

22. Apparatus according to claim 18 wherein said source of pressurized gas is an air compressor.

23. Apparatus according to claim 22 wherein said fluid actuator is a pneumatic actuator and said means for supplying fluid under pressure to said actuator comprises conduit means for connecting said actuator to a source of pressurized air and valve means for controlling the rate of flow of air to said actuator.

24. Apparatus according to claim 14 further including drive means for rotating said roll on its axis.

25. Apparatus according to claim 14 further comprising first transport means for transporting a first web over said roller, second transport means for transporting a second web over said roller so that (a) said first web is disposed between said second web and said roller and (b) said second web is disposed between said first web and said nip member, whereby gas exiting said at least one passageway will press said first and second webs into engagement with each other against said roller and establish a gas bearing between the second web and the nip member.

26. Apparatus according to claim 25 wherein said roller is made of a metal material.

27. Apparatus according to claim 26 for use in thermally duplicating on a magnetic copy tape a magnetic record previously recorded on a master tape, wherein said second web transport means comprises means for holding a supply reel of copy tape, means for holding a take-up reel for rewinding said copy tape, and means for transporting said copy tape from said supply reel to and between said roller and nip member and then to said take-up reel, and further including means for heating said copy tape as it approaches said roller and nip member and means for cooling said copy tape as it moves away from said roller and nip member.

28. Apparatus according to claim 27 wherein said first web transport means comprises a bin for storing a master tape, and means for transporting a master tape from said bin to and between said roller and said nip member and then back to said bin.

29. A method for copying magnetic recordings from a first magnetic storage medium onto a second magnetic storage medium comprising the steps of transporting said first medium on a roller past a predetermined point, transporting said second medium so that it converges on said first medium on said roller, pneumatically disposing an air bearing against said second medium to press said second medium against said first medium on said roller at said predetermined point so that the two mediums travel as one on said roller past said predetermined point, separating said mediums downstream of said predetermined point, heating said second medium to a temperature above its Curie point as it approaches contact with said first medium on said roller at said predetermined point, cooling said second medium to a temperature below its Curie point while it is in contact with said first medium, and cooling said second medium further as it moves away from said predetermined point.

30. A method according to claim 29 wherein said roller is driven by a drive means connected thereto.

31. A method according to claim 29 wherein said mediums are magnetic tapes.

32. A method according to claim 29 wherein said first medium is an endless magnetic tape.

33. A method according to claim 32 wherein said endless tape is recirculated into and out of a bin.

34. A method according to claim 29 wherein said roller is a metal heat sink.

35. Apparatus for use in transporting and guiding at least one web comprising:

a roller having peripheral surface;

a nip member for use in pressing said at least one web against said peripheral surface as said web is transported past said nip member, said nip member including a web-guiding surface having a radius of curvature substantially the same as the radius of curvature of said peripheral surface;

at least one gas-discharge passageway formed in said web-guiding surface and adapted to direct a gas toward said roller and away from said web-guiding surface;

means for supplying a gas under pressure to said at least one gas-discharge passageway so that said gas will be directed toward said roller;

means for adjusting the flow of gas through said at least one gas-discharge passageway;

supporting means for supporting said nip member so that said nip member is capable of movement along a selected path so as to advance said web-guiding surface toward and away from said peripheral surface;

a pneumatic actuator mounted to said support means and adapted to urge said nip member to move in a straight line so as to advance said web-guiding surface toward and away from engagement with said peripheral surface, whereby when a web is disposed between said peripheral surface and said web-guiding surface, gas under pressure exiting said at least one passageway will press said web into engagement with said roller while allowing the web to move and will exert a back pressure on said web-guiding surface tending to urge said nip member away from said roller and establish a gas bearing between said nip member and said web; and means for supplying a gas under pressure to said pneumatic actuator so as to cause said actuator to move toward said web with enough force to maintain said gas bearing between said nip member and said web.

36. Apparatus according to claim 35 further comprising;

first transport means for transporting a first web over said roller;

second transport means for transporting a second web over said roller so that said first web is disposed between said second web and said roller and said second web is disposed between said first web and said nip member, whereby gas exiting said at least one passageway will press said first and second webs into engagement with one another and against said roller and establish a gas bearing between said second web and said nip member;

means for heating said second web as it approaches said roller and said nip member so as to allow said second web to thermally duplicate said first web when said first and second webs comprise magnetic recording tape; and means for cooling said second web as it moves away from said roller and said nip member.

* * * * *